UNITED STATES PATENT OFFICE.

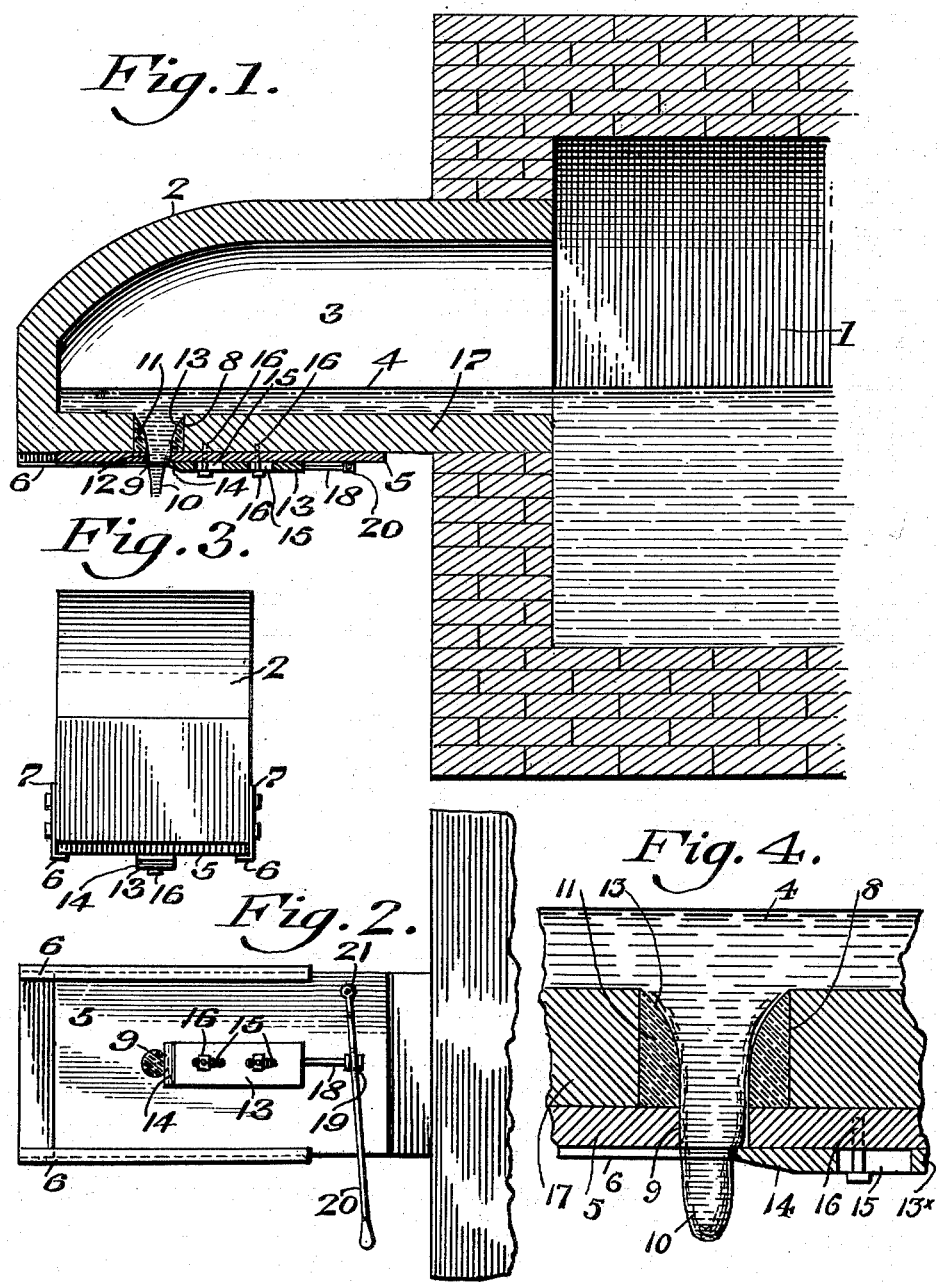

JOHN WILLIAM GAYNER, OF SALEM, NEW JERSEY.

REGULATING DEVICE FOR MOLTEN GLASS AND MEANS FOR PREVENTING THE STREAKING OF GLASSWARE.

1,090,101.     Specification of Letters Patent.     Patented Mar. 10, 1914.

Application filed November 14, 1912. Serial No. 731,254.

*To all whom it may concern:*

Be it known that I, JOHN WILLIAM GAYNER, a citizen of the United States, residing at Salem, in the county of Salem, State of New Jersey, have invented a new and useful Regulating Device for Molten Glass and Means for Preventing the Streaking of Glassware, of which the following is a specification.

My invention relates to improvements in a glass feeding apparatus for tanks, pots and similar receptacles, wherein raw material is melted and treated until it has reached the proper consistency or fluidity for molding or gathering purposes.

It has heretofore been the practice in glass furnaces to provide the snout of the glass furnace with a discharge orifice or outlet, directly in the clay bottom thereof or to locate therein, a detachable or removable cup made of clay or similar non-fusible material, through which the molten glass flows, according to requirements, to the molds or machine for making glassware or other apparatus, wherein the molten glass is subsequently subjected to the desired treatment.

I have found by experience, that in the manufacture of glassware, by reason of the molten glass passing along the side of or through the cup or outlet of the prior art, which, as stated, is ordinarily composed of clay, the glassware will be streaked or marked, by reason of the contact of the molten glass with said clay cup or orifice.

The object of my present invention is therefore to provide a device for the purpose of getting clearer glass into the glassware, or other articles manufactured, and I have discovered that by the employment of a floor plate below the orifice of the snout of the glass furnace having an opening therein of less area than the usual clay outlet of the snout of the furnace, I am enabled to produce and provide a support for a devitrified or hardened annular glass orifice, which becomes harder and more durable the longer the furnace is used, the glass surrounding the orifice becoming devitrified and the molten glass as it passes along by or through the walls of the devitrified glass or hardened glass annulus will not streak the glassware or mark it, as is the case when merely the clay cup or annular clay wall of the prior art is employed.

It is also oftentimes desirable in the manufacture of glassware and the like, to increase or retard the flow of the molten glass through the outlet of the snout of the glass furnace so as to get the right volume of glass for the machine, and for this purpose, I have provided a novel construction of device for regulating the flow of the molten glass, which latter is adapted to be secured to the floor plate of the snout of the furnace and to be manually or otherwise operated by a suitable lever or other actuating device, so as to partially open or close the outlet from the snout of the glass furnace, whereby the flow may be increased or retarded according to requirements.

To the above ends, my invention consists of a novel construction of device for the outlet of a glass furnace, whereby I am enabled to get clearer glass into the glassware or other articles manufactured, and it also consists of a novel construction of device for regulating the flow of molten glass, according to requirements.

For the purpose of illustrating my invention, I have shown in the accompanying drawing one form thereof which is at present preferred by me since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a sectional view of the snout of a glass furnace having thereon improvements embodying my invention. Fig. 2 represents a bottom plan view of Fig. 1. Fig. 3 represents an end view of Fig. 1. Fig. 4 represents a sectional view, on an enlarged scale, showing a portion of the apparatus seen in Fig. 1.

Similar numerals of reference indicate corresponding parts in the figures.

Referring to the drawings:—1 designates a conventional form of a glass tank or furnace, wherein raw material is melted, said tank being provided with a snout or extension 2 having a compartment 3, formed therein, adapted to receive a quantity of the molten glass 4 from the tank 1. The molten glass or batch of molten material 4 can be maintained in a fluid state and of a consistency advantageous to the production of glassware, and similar articles, by any suitable means, which I do not deem necessary to describe in detail since they form no part of the present invention. Upon the under side of the snout or extension 2, I secure a floor plate 5, the latter being supported by or held between the flanges 6 of the side plates 7, which are attached to the side walls of the snout 2 by any suitable means, as will be understood from Fig. 3. The outlet or orifice 8 of the forward end or snout of the glass furnace is made of sufficient diameter, according to requirements, and is larger than the outlet opening or port 9 in the floor plate 5, through which the batch of molten material flows. The floor plate 5 is made of iron, and it will be apparent that said iron has a chilling action on the stream of molten glass, and by reason of the port 9 being collocated with respect to the outlet 8, and being of smaller diameter, it will be apparent that a ledge or shoulder will be formed, which will initially chill and arrest slightly the flow of the molten glass until a ring of devitrified glass is formed, which will now be referred to.

11 designates an annular ring of devitrified or hardened glass, whose base is supported upon the inwardly extending portion 12 of the floor plate 5, which is in proximity to the port or outlet 9, the thickness of said devitrified or hardened glass ring 11 at its lower portion being substantially the distance between the opening 8 and the diameter of the outlet port 9, while the upper annular wall 13 of the devitrified or hardened glass ring 11 diverges on a curved line, as will be understood from Fig. 2, whereby the molten glass is permitted to readily flow through the outlet to the desired point. By the employment of the iron floor plate 5 constructed and arranged as described with respect to the outlet 8 of the clay bottom 17 of the furnace, and by proportioning the parts substantially as shown, it will be seen that the glass ring 11 will be formed contiguous to the clay bottom 17 and will become devitrified by reason of the slightly chilling action of the iron plate 5 and the molten glass as it passes along the walls of this devitrified or hardened glass annulus will not streak the glassware or mark it, as is the case when the opening is smaller and the hardened glass annulus omitted and there is an active flow of glass along the side of the clay wall or clay cup or clay ring, such as is generally employed.

It frequently happens in the manufacture of glassware, that there are times when the flow of molten glass should be increased or checked so as to get the right volume of glass for the glassware machine, which I accomplish by providing a regulating device 13ˣ having the beveled forward edge 14 and the openings 15 therein, through which the bolts 16 pass, said bolts passing through the floor plate 5 and entering the clay bottom 17 of the snout of the furnace. The slide or regulating device 13ˣ is readily adjusted according to requirements, by means of the rod 18 having the opening 19 therein, through which passes the handle or lever 20, the latter being fulcrumed to a suitable fixed point as 21. It will be seen that by proper manipulation of the handle or lever 20, the slide 13ˣ can be moved toward or away from the discharge outlet 9, of the floor plate so that the flow of glass as it runs from the glass furnace into the machine for making glassware and the like, may be regulated or increased or retarded, according to requirements.

In view of the fact that the regulating slide has a beveled edge or knife edge, the flow or column of glass through the outlet opening will be exposed to practically the same temperature at all sides and will not be chilled by exposure at one side and contact at another side, as would occur where the cut-off or regulating slide were formed with a straight wall or a wall which will remain in contact with the flowing glass. Glass is very sensitive to slight changes in the surrounding temperature, and a difference of comparatively few degrees at the sides of a column of glass will effect a perceptible difference in the consistency of parts of such column, which will have a detrimental effect upon the article formed from the glass.

It will thus be seen from the foregoing that I have provided novel means for enabling the molten glass to flow from the snout of the glass furnace, so that the glassware will not become streaked or marked, as is the case when the glass is discharged along the side of the clay wall or clay discharge outlet, and I have also provided novel means for regulating the flow of the molten glass, according to requirements, as it runs from the glass furnace to the machine for making glassware or other articles.

I am aware of the patent to Brooke #723,983, March 31, 1903, which shows coacting cutting devices, one being a movable blade and the other a cup or trough shaped receptacle having a cutting edge, in combination with means for elevating and oscillating said cup-shaped receptacle, said cutting devices being described as acting upon a flowing stream of molten material which is not taken directly from the furnace as in the case of my invention, but is taken from a movable conduit arranged in proximity to the furnace, which is required to be lowered, tilted, or otherwise actuated before the molten glass will flow therefrom. My invention is therefore clearly differentiated from said Brooke device, since in my apparatus I preferably conduct the molten stream of glass directly from the furnace and permit the same to flow by gravity directly to the cutting or other mechanism, which feature of taking the molten stream directly from the furnace and permitting it to flow by gravity directly therefrom is not mentioned or described in said Brooke patent and to none of the features of said Brooke patent do I herein make my claim.

It will now be apparent that I have devised a novel and useful construction of a regulating device for molten glass, and means for preventing the streaking of glassware, which embodies the features of advantage enumerated as desirable in the statement of the invention and the above description and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device for the continuous delivery of molten glass, means for preventing the streaking of glassware, comprising a glass furnace having a discharge opening therein, a metallic floor plate secured below said opening, and having a port therethrough of less diameter than said discharge opening, and a ring of devitrified or hardened glass surrounding said opening above said port and supported upon said floor plate.

2. In a device of the character stated, a glass furnace, an extension therefor, an outlet for the molten glass in said extension, a metallic floor plate supported below said outlet and having a port therein of less diameter than said outlet, retaining devices for said floor plate, a regulating device movable on said floor plate and having a forward beveled edge on its under side, and means for actuating said regulating device.

3. In a device of the character stated, means for preventing the streaking of glassware, comprising a glass furnace having a discharge opening therein, a ring of devitrified or hardened glass surrounding said opening and suitably supported therein, a regulating device movably supported with respect to said opening and having a forward beveled edge on its under side, and means for actuating said regulating device.

4. In a device of the character stated, a glass furnace having a downward discharge opening therein, a floor plate secured below said opening, and a movable regulating device beneath said floor plate having its forward portion beveled on its under side to present a knife edge at said opening.

JOHN WILLIAM GAYNER.

Witnesses:
C. D. McVay,
F. A. Newton.